June 23, 1964 R. E. PARK ETAL 3,138,368
FORMING CASTINGS
Filed June 15, 1961 2 Sheets-Sheet 1
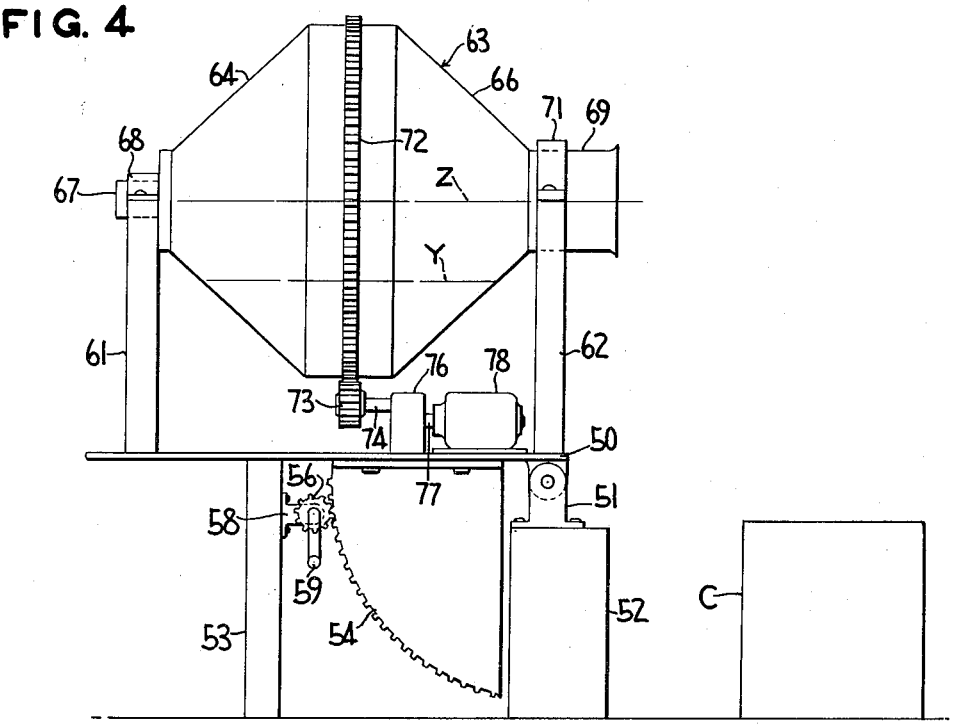
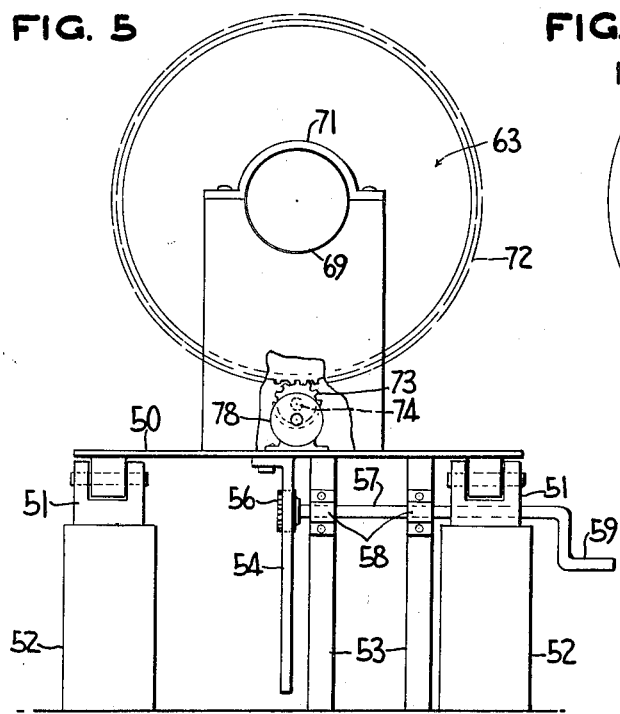
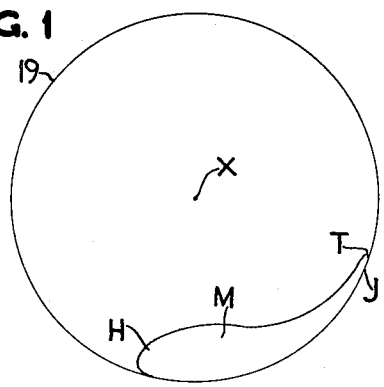
INVENTORS
ROBERT E. PARK and
BY CARL P. IZZO
Oscar L. Spencer
ATTORNEY June 23, 1964  R. E. PARK ETAL  3,138,368
FORMING CASTINGS Filed June 15, 1961  2 Sheets-Sheet 2

INVENTORS
ROBERT E. PARK and
CARL P. IZZO
BY
Oscar H Spencer
ATTORNEY

United States Patent Office 3,138,368
Patented June 23, 1964

3,138,368
FORMING CASTINGS
Robert E. Park, Allison Park, and Carl P. Izzo, Verona, Pa., assignors to Pittsburgh Plate Glass Company, Pittsburgh, Pa., a corporation of Pennsylvania
Filed June 15, 1961, Ser. No. 117,438
2 Claims. (Cl. 259—81)

This invention relates to a method of agitating liquids, and it has particular relation to a method of agitating a relatively viscous mixture of resinifiable components in order to incorporate a catalyst or other component without introducing bubbles of gas.

It has heretofore been recognized that the agitation of liquids by use of conventional apparatus for tumbling, stirring or shaking a liquid often results in incorporating bubbles of gas, such as air, into the mixture. If the liquids are sufficiently viscous, the gas cannot readily escape and may be permanently entrapped as bubbles in the final products. This was especially true of resinifiable materials, such as liquid, castable mixtures of $>C=CH_2$ monomers and polyesters of glycols and alpha, beta-ethylenic dicarboxylic acids. In order fully to cure these at reasonable temperatures and within a reasonable period of time, it was usually necessary to add a small amount of a curing catalyst, represented by benzoyl peroxide, cumene hydroperoxide and many others. If this operation were to be completed in a reasonable time, it was necessary vigorously to stir or otherwise to agitate the mixtures. When conventional methods of agitation were used, bubbles were also introduced and often could not escape before the mixture started to gel or set. It was then virtually impossible to eliminate the bubbles. They often seriously impaired the utility or appearance of the finished articles. This was especially true in clear, transparent castings and sometimes it occurred in liquids containing pigmentary materials, such as pearl essence, flake aluminum, and the like. For example, in the instance of materials containing pearl essence and flake aluminum, the opalescent effects characterizing such use is at least in part the result of the orientation of the particles in the matrix. When bubbles of gas were present, they, by their movement, tended to deorient the particles and thus produced objectionable defects in the articles.

This invention comprises the provision of a method of agitating liquid materials, such as interpolymerizable mixtures as represented by $>C=CH_2$ monomers and polyesters of alpha, beta-ethylenic dicarboxylic acids or other liquids, wherein the foregoing difficulty is reduced or eliminated. These results are attained by placing the materials to be mixed in a container, which preferably is circular or nearly circular in section, and in an amount but partially to fill the container, and then rotating the container about an axis which is inclined from the vertical. The speed of rotation is so adjusted that a standing pool of the material being agitated is formed, but a layer of material is drawn from this pool by the walls of the container as the latter rotates. As the layer of liquid is carried upwardly by the rotating walls of the container, the surface portions thereof tend to drain back down into the pool. The speed of rotation must be so adjusted that the centrifugal force does not completely overcome this backward movement. Under these conditions, there is a continuous flow of contacting liquid layers in opposite directions with a relatively high degree of viscous shear between the layers. The shearing effect thoroughly and quickly mixes the material without affording an opportunity for introduction of appreciable amounts of air.

For a better understanding of the invention, reference may now be had to the drawings wherein like numerals refer to like parts throughout, and wherein—

FIGURE 1 is a diagrammatical view approximately illustrating the section of the liquid pool in the container and the relative movements of the layers of liquid.

FIGURE 4 is an elevational view of a further embodiment of an apparatus whereby the techniques of this invention may be conducted.

FIGURE 5 is an elevational view of the apparatus shown in FIGURE 4, but being taken in a direction at right angles to that of FIGURE 4.

Figure 2:
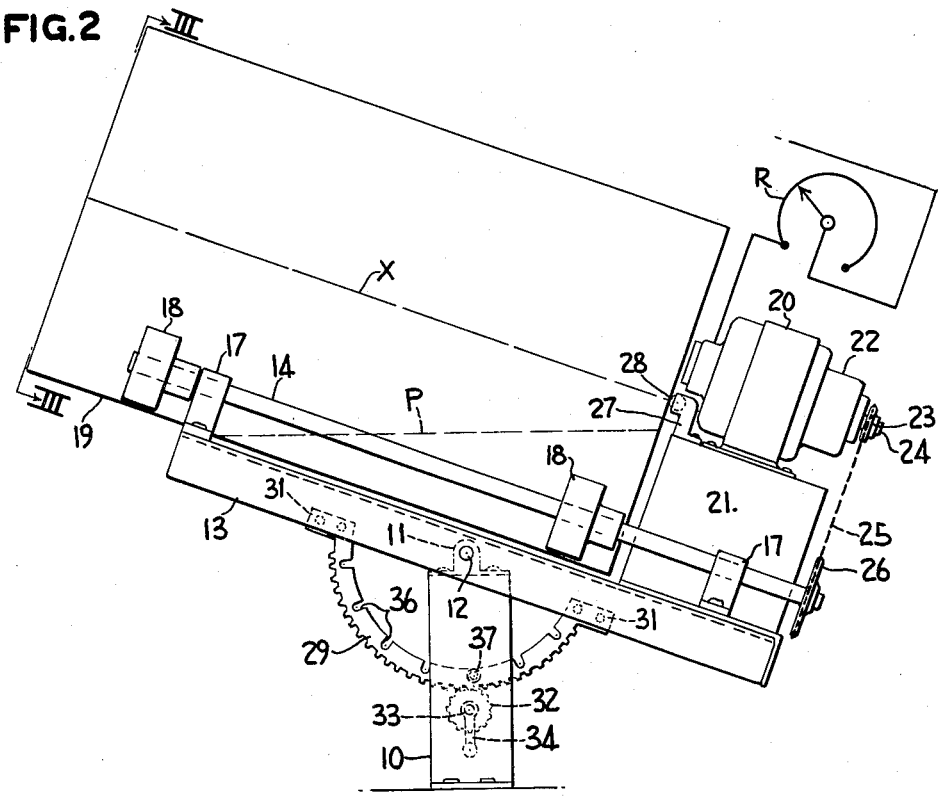
FIGURE 2 is a side elevational view of one form of apparatus by use of which a liquid can be agitated following the techniques of this invention.
Figure 3:
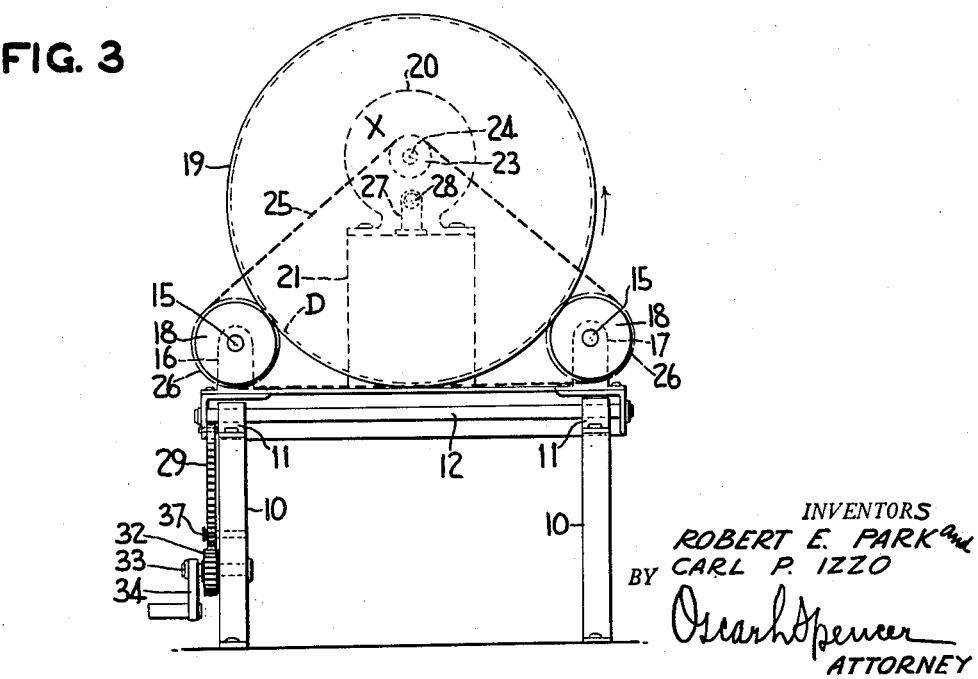
FIGURE 3 is an end elevational view of the apparatus shown in FIGURE 2, but showing the container in horizontal position.

The apparatus shown in FIGURES 2 and 3 comprises a pair of spaced supports 10 having pillow bearings 11 upon the upper ends thereof for trunnions 12 of a tiltable frame 13. The frame is also provided with transversely spaced shafts 14 and 15 journaled in pillow bearings 16 and 17, and the shafts have rollers 18 rigidly secured thereupon and rotatably supporting a container 19, which, as shown, may be in the form of a conventional drum or barrel of circular section. The drum may be of steel or other metal, with or without a coating of such material as glass, or an organic material such as Teflon, polyethylene, or the like. When the shafts 14 and 15 are rotated, the rotary movement is transmitted to the drum and the latter is caused to rotate about its central axis.

Means to rotate the shafts comprises a motor 20 disposed upon the housing 21 at the rear of frame 13 and parts of which are shown as being broken away for purposes of clarity of illustration. The motor drives a speed reducing mechanism, indicated diagrammatically at 22, and which may be of fixed ratio or, if preferred, it may be of adjustable ratio in order mechanically to permit the adjustment of the rate of rotation of the mechanism. Sprocket gear 23 upon the shaft 24 of said mechanism has a driven chain 25 trained thereabout and being further trained about larger sprocket gears 26 on shafts 14 and 15. When the motor is driven, the shafts are rotated, thereby rotating container 19 to effect agitation of the liquid.

Means positively to prevent downward and rearward slippage of the container upon the rollers 18 comprises a bracket 27 which may be provided with a tip portion having a ball 28 which bears against the bottom of the container at or near the central axis thereof. At this point, there is but little or no relative translatory movement of the surface of the bottom of the container with respect to the tip and therefore there is relatively little wear. If desired, the ball may also be rotary in a socket, thus further reducing friction against the bottom of the container.

The mechanism is normally operated with the drum in inclined position (as shown) so that the pool P of liquid being agitated may be maintained in the lower portion thereof. If desired, the container may also be provided with a tight fitting cover or lid (not shown) designed to reduce evaporational losses in event that one or more of the materials being agitated in the container is volatile. However, such lid is optional and is not shown.

Means to tip the container through various angles in order to provide for holding various amounts of liquid, or in order to permit the contents of the container to be drained into a mold or other receptacle comprises a segmental gear 29 secured to the lower side of frame 13, for example, by means of brackets or lugs 31. The gear engages a pinion 32 fixed on shaft 33 and being journaled in bearings formed by suitably boring the supports 10. The shaft is further provided with a crank 34 whereby it can be manually rotated to move the segmental gear 29 to any position required in tipping the container through various angles. To hold the frame in any predetermined position, suitable latch mechanisms may be provided, of which a simple embodiment is illustrated as comprising notches 36 formed in the inner perimeter of the gear and being engaged by a pin 37 removably inserted in a hole in support 10. The pin may be engaged with any preselected notch in order to hold the frame at any desired angle.

In the operation of the apparatus, the frame 13 is tilted upwardly to an appropriate angle with respect to the horizontal, the angle being sufficient to prevent liquid from spilling over the edge of the container, but being well below the vertical position. As shown diagrammatically in FIGURE 1, a quantity of liquid to be agitated is then introduced into the container. Most usually, the quantity is such that all, or nearly all, of the liquid will lie in pool P below the axis X of the container. In other words, the container is substantially less than half full and preferably is about one-tenth to about one-third full. There should be an adequate free space above the liquid level to allow a substantial part of the liquid drawn up by the walls of the container as they rotate, to flow back down into the pool. The downward flow is over the rising layer of liquid clinging to the walls of the container. The movement of the liquid is approximately diagrammatically represented in said FIGURE 1, wherein a section through the pool P when the container 19 is rotated is represented. As shown in this view, the material, owing to its viscosity, is drawn into a tail T upwardly along the upwardly inclined portion J of the wall in the direction of rotation of the container; on the opposite, downwardly inclined side D, the material tends to be backed up by the rotation of the container, thus forming a somewhat thickened head H. The pool thus tends to assume a section which is of a modified comma or curved teardrop shape. The top layer of the material, as represented at M, by the arrows is flowing by gravity over the bottom layer, which in effect is flowing in the opposite direction owing to the drag of the rotating wall. The liquid between the top and bottom layers is subjected to strong shearing effects, thus producing thorough mixing at a relatively rapid rate. The rate of rotation of the container should be great enough to assure a reasonable speed of mixing, but is not allowed to become so great that large amounts of liquid are carried up to the overhanging portion of the wall, in which position they would tend to drop or fall free into the pool and thus introduce bubbles of air. An adherent film of liquid may be carried by the surface of the container across the arc above the pool, but the rate of rotation is kept sufficiently low that it will not generate centrifugal force to arch the pool P across the top of the circle. The production of voids with resultant entrapment of air bubbles is avoided.

Naturally, an admissible speed of rotation depends upon such independent variables as viscosity of the liquid, amount of liquid in the container, and others. There is no practical rule for calculating a priori this rate, but it can easily be determined by mere observation if the pool P is properly maintained. The speed is adjusted so that the pool is maintained at P and the liquid flows smoothly back into the pool without substantial dropping and splashing in free fall. The speed of rotation may be adjusted by varying the speed reducing mechanism 22, or if the motor 20 is of direct current type, the speed thereof may be adjusted by means of a rheostat R connected in the circuit of the field coils of the motor in well-known manner.

In the form of the apparatus illustrated in FIGURES 4 and 5, a tiltable frame 50 is mounted to rotate in bearing 51 upon a support 52 at one end thereof. The frame may be held in approximately horizontal position by resting upon a second support 53 spaced from the first. Means to tilt the frame from horizontal position to inclined position comprises a segmental gear 54. This gear is concentric with bearing 51 and engages a pinion gear 56 upon a shaft 57 that can be rotated in bearings 58 secured on support 53. A crank 59 upon shaft 57 constitutes a simple means whereby the shaft 57 may be rotated to swing the free end of the frame upwardly to a position to dump the contents of the container (to be described) for the resin to be mixed. Needless to say, motor means could also be provided to actuate the shaft 57, if so desired.

The top of the frame 50 is provided with spaced supports 61 and 62 for rotary container 63 having frustoconical end sections 64 and 66, the first of which at its apex is provided with a stub shaft 67 rigidly affixed to the container and rotating in pillow bearing 68 upon the support 61. The end section 66 of the container at its apex is open to allow charging and discharging, and is further provided with a neck portion 69 which rotates in a bearing 71 on support 62.

Means to rotate the container comprises a ring gear 72 rigidly affixed about the mid-portion of the container and being engaged and driven by a pinion 73. The pinion is further carried by and driven by a shaft 74 from speed control mechanism 76. This mechanism may be of fixed or of variable ratio, as may be desired, and is driven by shaft 77 of a conventional motor 78.

In the operation of this apparatus, the frame 50 is disposed in horizontal position and the container then receives an appropriate charge of liquid, the level of the liquid being indicated in broken line at Y. The latter is well below the horizontal axis Z of the container. Usually, the container will not be more than about one-third full and the contents may be much less than this. The adjustments of speed of the container illustrated in this figure corresponds to those already described in connection with the embodiment shown in FIGURES 2 and 3, and the movements of the liquid in the pool below the level of line Y are substantially the same as those of the liquid in the pool P.

Obviously, when a charge of liquid has been adequately mixed, it is discharged by turning the shaft 57 to tilt the frame 50. The contents of the container, or any desired portion thereof, are then drained out and may be caught in a container or a mold, shown for purposes of simplicity as at C.

The process of agitating liquids without introducing gas may be conducted by the use of other embodiments of apparatus, though, of course, these must all comprise a suitable container adapted to be rotated about an appropriate axis. If the quantities of liquid to be agitated are but small and if manual labor in the mixing is not objectionable, a simple cylindrical drum is sufficient for the job. The liquid in suitable amount is then disposed in the drum and the drum is inclined from vertical, for example, to approximately the attitude illustrated for the drum 19 in FIGURE 2. The drum, while resting on its lower edge, is then manually rotated about its axis until the liquid has been sufficiently agitated.

The process of this invention may be applied to the agitation of substantially any liquid wherein gas bubbles may be objectionable. As already implied, these liquids are usually viscous, since bubbles of gas will inherently and quickly escape from a liquid which is nonviscous, and there will then be but little advantage in using the techniques herein disclosed in the mixing operation. The viscosity of the liquids which are employed in the process will usually fall in a range between about 400 or 500 centipoises and about 50,000 or 60,000 centipoises. Plastic-forming liquids often constitute examples of such liquids. They are frequently too viscous to permit ready escape of gas bubbles which may become entrapped therein, and the bubbles may be objectionable if they are left.

Often a viscous component of a plastic is mixed with added components, such as plasticizers, catalysts, cross-linking agents, pigments, and other materials, to provide mixtures for casting or otherwise forming into various articles, such as buttons, costume jewelry, articles of art, optical lenses, or sheets or bubbles for glazing airplanes or other vehicles, or other articles too numerous to mention. Some of the materials that may be so used comprise acrylic resins, mixtures of epoxy resins, mixtures of polyesters of dihydric alcohols, and alpha, beta-ethylenic dicarboxylic acids and $>C=CH_2$ monomers. The process can be used in mixing viscous higher polyols, used with organic polyisocyanates in the formation of polyurethane resins, or in the addition of curing agents and other agents thereto. Likewise, the process may be used in mixing polyglycidyl ethers, such as reaction products of 2,2-bis(4-hydroxyphenyl)propane and epichlorohydrin, with curing agents, such as amines. Many other applications too numerous to mention will be apparent.

A particularly important class of materials to which additions may be effected using the techniques and apparatus of this invention comprises the interpolymerizable mixtures of $>C=CH_2$ monomers and polyesters of glycols and alpha, beta-ethylenic dicarboxylic acids. The techniques may be used in adding gelation inhibitors and catalysts thereto. Many such mixtures are disclosed in United States Patent No. 2,593,787 to Parker.

*Example*

The viscous material of this example comprises a polyester of a polyol; namely, propylene glycol, and an approximately equivalent amount of a mixture of equal moles of maleic anhydride and phthalic anhydride. This mixture is cooked in conventional manner until a suitable viscosity is attained. The viscosity as determined upon a 60 percent solution in monomethyl ether of ethylene glycol at 77° F. is about 10,000 centipoises. The polyester is formulated into a castable composition comprising:

| | |
|---|---|
| Polyester | 2.0 parts by weight. |
| Styrene | 1.0 part by weight. |
| Inhibitor of gelation (trimethyl benzyl ammonium chloride) | 0.1 percent based upon the mixture. |
| Quinone | 0.001 percent based upon the mixture. |

When castings are to be formed, this mixture is introduced into an inclined or horizontal, rotary container, such as one of those illustrated in the drawings, in an amount corresponding to the limits previously indicated. A catalytic material, such as benzoyl peroxide, methyl ethyl ketone peroxide, or cumene hydroperoxide, in an appropriate amount is then disposed upon the surface of the liquid pool in the container. The amount of catalyst will naturally vary with its activity and be dependent upon the speed of curing desired in the mixture. Usually, the amount will be in a range of about 0.1 to about 3 percent of active ingredient based upon the total mixture of polyester and monomer. When the catalyst has been introduced, the container is rotated in the manner already described in order to incorporate the catalyst uniformly and quickly into the mixture, but without introducing air bubbles. Rotation is continued until the catalyst has been substantially completely and uniformly incorporated. When the catalyst has been adequately dispersed in the liquid, agitation is stopped and the liquid is poured into a mold or molds and is allowed to gel and cure. Gelation and curing, if desired, may be speeded up by application of external heat, though this is not in all instances required. The curing is conducted in accordance with conventional practice employed in connection with the specific resin.

Obviously, the foregoing constitutes but a typical example of a material which may be subjected to agitation by the method disclosed herein without introduction of gas, such as air, into the body of the liquid. The same techniques and apparatus may be employed with other liquids having similar characteristics.

We claim:

1. The method of agitating a liquid which is polymerizable to a solid, resinous state and of a viscosity between about 400 and about 60,000 centipoises, and an added material to form a liquid mixture without entrapping gas therein from an atmosphere contacting the liquid, which comprises disposing the liquid and the added material in a container of substantially circular section, partially to fill the same, and rotating the container about its central axis, said axis being in nonvertical position, the rate of rotation allowing a pool of said liquid to remain in the lower portion of the container, but further allowing some of the liquid to be drawn up by the walls of the container and quiescently to drain back down over the surface of the liquid being drawn up, and to return to the pool without arching over and falling back into the pool, continuing to rotate the container until the added material has been uniformly incorporated and then pouring the flowable liquid, substantially bubble-free mixture from the container as a coherent, liquid body.

2. The method of agitating a liquid mixture of a polyester of a glycol and an alpha, beta-ethylenically unsaturated dicarboxylic acid and a $>C=CH_2$ monomer, the mixture being of a viscosity in the range of about 400 to about 60,000 centipoises with a catalyst of polymerization and a pearlescent pigment, which comprises disposing the mixture and the catalyst of polymerization in a container partially to fill the same, the container being of substantially circular section and rotating the container about its central axis, the axis being in nonvertical position, at a rate which will allow a pool of the liquid material to remain in the lower portion of the container, but which will further allow some of the liquid to be drawn up by the walls of the container and quiescently to drain back down over the surface of the liquid being drawn up, and to return to the pool without arching over and falling back into the pool, continuing to rotate the container until the added material has been uniformly incorporated and then pouring the coherent, liquid, flowable, substantially bubble-free mixture from the container as a coherent, liquid body which can be cured to a solid, bubble-free state.

References Cited in the file of this patent

UNITED STATES PATENTS

| | | |
|---|---|---|
| 159,899 | Cairns | Feb. 16, 1875 |
| 2,510,858 | Black | June 6, 1950 |